United States Patent [19]

Oyagi et al.

[11] Patent Number: 5,667,310
[45] Date of Patent: Sep. 16, 1997

[54] MOLTEN METAL IMMERSION SLIDING BEARING AND CONTINUOUS HOT-DIP PLATING APPARATUS

[75] Inventors: Tomohito Oyagi, Suita; Mitsuo Nakagawa, Mito; Junji Sakai, Minori-machi; Takahiko Okouchi, Hitachinaka; Hitoshi Okoshi, Hitachi, all of Japan

[73] Assignee: Hitachi, Ltd., Tokyo, Japan

[21] Appl. No.: 531,346

[22] Filed: Sep. 20, 1995

[30] Foreign Application Priority Data

Sep. 20, 1994 [JP] Japan ................................. 6-224748

[51] Int. Cl.⁶ .............................. F16C 33/74; B05C 3/12
[52] U.S. Cl. .................................. 384/137; 118/422
[58] Field of Search ........................ 384/137, 130, 384/276, 283, 284, 416, 428, 438, 444; 118/422

[56] References Cited

U.S. PATENT DOCUMENTS

| | | | |
|---|---|---|---|
| 775,730 | 11/1904 | Moss ................................. | 384/137 |
| 1,810,699 | 6/1931 | Diescher .......................... | 118/422 X |
| 2,026,598 | 1/1936 | Taylor .............................. | 118/422 X |
| 2,310,162 | 2/1943 | Matteson ......................... | 118/422 |
| 4,275,098 | 6/1981 | Gunji et al. ..................... | 118/422 X |
| 5,072,689 | 12/1991 | Nakagawa et al. .............. | 384/283 X |

FOREIGN PATENT DOCUMENTS

| | | |
|---|---|---|
| 3-177552 | 8/1991 | Japan. |
| 5-70915 | 3/1993 | Japan. |

*Primary Examiner*—Thomas R. Hannon
*Attorney, Agent, or Firm*—Evenson, McKeown, Edwards & Lenahan, P.L.L.C.

[57] ABSTRACT

A sliding bearing to be immersed in molten metal has low friction and long life. The bearing is provided with a solid particle trap portion for preventing solid particles in the molten metal from penetrating between sliding surfaces of the shaft and the bearing and removing the solid particles. Abrasive wear and an increase in friction, caused by biting of the solid particles into the sliding surfaces can be prevented. A continuous hot-dip plating apparatus employs the sliding bearing in the molten metal.

13 Claims, 6 Drawing Sheets

MOLTEN METAL IMMERSION SLIDING BEARING AND CONTINUOUS HOT-DIP PLATING APPARATUS

BACKGROUND OF THE INVENTION

The present invention relates to a bearing submerged for use in molten metal and a continuous hot-dip plating apparatus using the bearing.

Hitherto, sliding bearings are used as molten metal immersion bearings for a continuous hot-dip plating apparatus, etc. because of the simplicity of their construction and convenience of their installation thereof. However, in these conventional bearings, metal compound fine particles which are called dross and oxide fine particles (those fine particles are referred to as solid particles hereunder) easily to penetrate between a shaft and a bearing during its rotation, and serve as abrasive grains to violently wear the bearing sliding members. Further, biting of solid particles raises frictional resistance, whereby smooth rotation is prevented.

In order to prevent the penetration of the solid particles between the sliding surfaces, a bearing having a construction covering the entire periphery of the shaft with carbon material is proposed in JP A 5-70915 (1993). However, with only the construction that the bearing covers all the periphery of the shaft, once solid particles penetrate between the sliding surfaces of the shaft and the bearing, and once the sliding surface of the shaft or the bearing are worn, a gap between the sliding surfaces of the shaft and the bearing increases and the solid particles easily penetrate further, as a result, the wear increases with increasing speed. Further, in order to prevent the penetration of the solid particles when the bearing covers the entire periphery of the shaft, it is necessary to control precisely the gap. However, since in practice changes in dimension or deviation in axes occur due to thermal expansion of the bearing submerged in molten metal, it is impossible to control precisely the gap.

Further, JP A 3-177552 (1991) discloses a method in which pins are set up on the sliding surface of a bearing or a plate is arranged to provide a convex shape on the sliding surface of the bearing, and solid particles penetrated between the sliding surfaces of the shaft and the bearing are scraped off thereby. However, this method does not solve the problem of solid material penetration because frictional resistance becomes large, solid particles become easy to penetrate from the concave shape on the sliding surface, etc.

Further, when molten metal immersion bearings of conventional construction are used for a continuous hot-dip plating apparatus, since play occurs due to wear of bearing portions and the quality of products is detracted, nowadays it is necessary to exchange the bearings frequently.

SUMMARY OF THE INVENTION

An object of the present invention is to provide a molten metal immersion bearing which has low wear loss and low friction in a solid particles containing molten metal.

Another object of the present invention is to employ the above-mentioned bearing in a continuous hot-dip plating apparatus to make its life long.

The inventors of the present invention have studied a bearing construction used in molten metal in order to make its wear loss and friction low. As a result, the following means achieving the above-mentioned objects were invented.

Preferred embodiments of the invention provides a molten metal immersion sliding bearing which comprises a sliding portion rotatably supporting a shaft and a solid particle trap portion for preventing penetration of solid particles in a molten metal between the shaft and the sliding portion and removing solid particles penetrated between the shaft and the slide portion, wherein the solid particle trap portion is arranged in contact with, or at, a position close to the sliding surface of the shaft.

Preferred embodiments of the invention provides a molten metal immersion sliding bearing which comprises a sliding portion rotatably supporting a shaft and a solid particle trap portion for preventing penetration of solid particles in a molten metal between the shaft and the sliding portion and removing solid particles penetrated between the shaft and the sliding portion, wherein the solid particle trap portion is arranged in contact with, or at, a position close to the sliding surface of the shaft, and wherein a portion of the solid particle trap portion which is in contact with or close to the shaft is made of material of fiber structure.

Preferred embodiments of the invention provides a molten metal immersion sliding bearing which comprises a sliding portion rotatably supporting a shaft and a solid particle trap portion for preventing penetration of solid particles in a molten metal between the shaft and the sliding portion and removing solid particles penetrated between the shaft and the sliding portion, wherein the solid particle trap portion is arranged in contact with, or at, a position close to the sliding surface of the shaft, and at a position close to the sliding portion on the side where the sliding surface of the shaft starts to contact a sliding surface of the bearing, and wherein a portion of the solid particle trap portion which is in contact with or close to the shaft is made of material of fiber structure. An example of the molten metal immersion slide bearing having this construction is shown in FIG. 1.

Preferred embodiments of the invention provides a molten metal immersion sliding bearing which comprises a sliding portion rotatably supporting a shaft and a solid particle trap portion for preventing penetration of solid particles in a molten metal between the shaft and the sliding portion and removing solid particles penetrated between the shaft and the sliding portion, wherein the sliding portion covers all the periphery of a sliding surface of the shaft and the solid particle trap is arranged in contact with, or at, a position close to the sliding surface of the shaft, and wherein a portion of the solid particle trap portion which is in contact with or close to the shaft is made of material of fiber structure. An example of the molten metal immersion slide bearing having this construction is shown in FIG. 2.

Preferred embodiments of the invention provides a molten metal immersion sliding bearing which comprises a slide portion rotatably supporting a shaft and a solid particle trap portion for preventing penetration of solid particles in a molten metal between the shaft and the sliding portion and removing solid particles penetrated between the shaft and the sliding portion, wherein the sliding portion covers all the periphery of a sliding surface and an end face of the shaft and the solid particle trap portion is arranged in contact with, or at, a position close to the sliding surface of the shaft, and wherein a portion of the solid particle trap portion which is in contact with or close to the shaft at the solid particle trap is made of material of fiber structure. An example of the molten metal immersion slide bearing having this construction is shown in FIG. 3.

Preferred embodiments of the invention provides a molten metal immersion sliding bearing which comprises a sliding portion rotatably supporting a shaft and a solid particle trap for preventing penetration of solid particles in a molten metal between the shaft and the sliding portion and removing solid particles penetrated between the shaft and the sliding portion, wherein the sliding portion covers all the periphery of a slide surface of the shaft and solid lubricant is used for at least one part of the sliding surface receiving force in a radial direction of the shaft from the shaft, and the solid particle trap portion is arranged in contact with, or at, a position close to the sliding surface of the shaft, and wherein a portion of the solid particle trap portion which is in contact with or close to the shaft is made of material of fiber structure. An example of the molten metal immersion sliding bearing having this construction is shown in FIG. 4.

Preferred embodiments of the invention provides a molten metal immersion sliding bearing which comprises a sliding portion rotatably supporting a shaft and a solid particle trap for preventing penetration of solid particles in a molten metal between the shaft and the sliding portion and removing solid particles penetrated between the shaft and the sliding portion, wherein the sliding portion covers all the periphery of a sliding surface and an end face of the shaft and solid lubricant is used for at least one part of the slide surface receiving force in a radial direction of the shaft from the shaft, and the solid particle trap is arranged in contact with, or at, a position close to the sliding surface of the shaft, and wherein a portion of the solid particle trap portion which is in contact with or close to the shaft is made of material of fiber structure. An example of the molten metal immersion sliding bearing having this construction is shown in FIG. 5.

According to further preferred embodiments, the setting position and shape of the solid particle trap portion of each molten metal immersion sliding bearing having the solid particle trap portion made of material having a fiber construction as mentioned above are not limited to the setting position and shape shown, for example in FIGS. 1 to 5, but is sufficient if it prevents penetration of solid particles between the sliding surfaces and if it removes solid particles from the sliding surfaces, and if it satisfies construction of each bearing.

According to further preferred embodiments, in the molten metal immersion bearing in which solid lubricant is used in at least one portion of sliding surface of the above-mentioned constructions, carbon material and hexagonal Boron Nitride (h-BN) each are desirable as the solid lubricant.

According to further preferred embodiments, as material having fiber construction and used for the above-mentioned solid particle trap portion, at least one material of alumina fiber, carbon fiber and carbon felt is desirable. Further, in case the above-mentioned solid particle trap portion is in contact with the above-mentioned shaft, the solid particle trap portion is pressed on the shaft with a contact pressure which does not prevent free rotation of the shaft. As for load pressing the shaft at the solid particle trap, such a pressure is desirable such that frictional resistance between the power trap portion and the shaft during rotation does not go beyond 50% of the total frictional resistance between the shaft and the bearing. Further, when the above-mentioned solid particle trap portion is arranged close to the above-mentioned shaft, the gap between the solid particle trap portion and the shaft is desirably kept in a range of 0.01 to 0.1 mm.

The above-mentioned molten metal immersion bearing presents its effect in particular when it is used in the molten metal of which a main component is molten zinc or molten aluminum.

According to further preferred embodiments, a continuous molten zinc dip plating apparatus to which the molten metal immersion bearing of the above-mentioned construction is applied was invented.

The present invention resides in a molten metal immersion bearing used in a immersed state in a molten metal and provided with a solid particle trap portion which prevents penetration of solid particles between sliding surfaces of a shaft and the bearing and removes solid particles penetrated between the sliding surfaces of the shaft and the bearing. By providing the solid particle trap portion, it becomes possible to prevent abrasive wear of the sliding surfaces of the shaft and the bearing due to penetration of solid particles and increase in frictional resistance during rotation. Therefore, molten metal immersion bearings having longer life and lower friction than conventional bearings can be obtained.

In a preferred embodiment of a molten metal immersion bearing according to the present invention, the bearing is provided with a solid particle trap portion made of material having fiber structure. In FIG. 1, the fabric structure of the solid particle trap portion either in contact with the shaft and pressed on the shaft with contact pressure to the extent that free rotation of the shaft is not prevented, or disposed at a position close to the shaft with a proper gap between the sliding surfaces. The construction shown in FIG. 1 makes it difficult for solid particles to penetrate between the sliding surfaces of the shaft and the bearing during rotation further if solid particles penetrate, they can be removed b the fiber structure of the solid particle trap portion. Further, the construction can prevent adhesion of solid particles on the sliding surfaces of the shaft and the bearing. The bearing is characterized in that penetration of solid particles between the sliding surfaces of the shaft and the bearing is prevented and the penetrated solid particles are removed. The bearing is different from the conventional bearing in which pins or plates are mounted on the bearing sliding surfaces to scrape the solid particles.

According to preferred embodiments bearings used in a molten metal immension as mentioned above, besides the fact that the bearing is provided with a solid particle trap portion made of material having fiber structure, the entire sliding periphery of the shaft is covered with the bearing as illustrated schematically in FIG. 2, whereby an effect of prevention of penetration of solid particles between the sliding surfaces of the shaft and the bearing is raised further. In a conventional construction of a bearing covering all the sliding periphery of a shaft, as mentioned above, there was a problem of accelerated wear by solid particles and a problem of precise control of the gap. However, in the construction of a bearing according to the present invention, not only is all of the periphery of sliding surface of the shaft covered with the bearing to make it difficult for solid particles to penetrate between the sliding surfaces, but penetrated solid particles are always scraped by the solid particle trap portion, whereby an accelerated increase in wear is prevented. Further, by an elastic effect of the fiber structure used in the solid particle trap portion and an effect of change in volume, the gap between the shaft and the bearing can be kept to zero (0) even if dimension changes due to thermal expansion of the bearing in the molten metal, or deviation in axes, or a little wear occurs.

Further, in a molten metal immersion bearing to which external force is applied in a constant orientation of a radial direction of the shaft at time of rotation, the bearing covers all the sliding surface of the shaft as illustrated schematically in FIG. 4, solid lubricant is applied to at least one part of the sliding surface to which the external force is applied in the radial direction. The solid particle trap portion made of material having fiber structure is provided for the sliding surface, whereby solid particles in the molten metal can be removed at time of rotation, and an effect of lowering frictional resistance can be attained.

In further preferred embodiments, as for the molten metal immersion bearing having a construction of covering all the sliding surface of the shaft, by covering an end face too as shown in FIG. 3, not only penetration of solid particles but penetration of the molten metal itself can be reduced, and the useful life of the bearing can be made longer. The effect of this covering of the shaft end face also is effective for a bearing in which solid lubricant is applied for a part of the bearing, as shown in FIG. 5.

Still further, as the above-mentioned solid lubricant, it is desirable to use at least one of carbon material and h-BN. These materials are each solid lubricants having low friction in a temperature range in which metals such as zinc, and aluminum are molten, and have an effect of lowering frictional resistance of the bearing.

In further preferred embodiments, it is desirable that the material having fiber structure is at least one of alumina fiber, carbon fiber and carbon felt. These materials each have excellent anti-corrodibility to the molten metal and an effect of prevention of penetration of solid particles and removal of the solid particles when the materials are used for the solid particle trap portion.

Further, when the above-mentioned solid particle trap portion is in contact with the above-mentioned shaft, it is necessary that the solid particle trap portion is pressed on the sliding surface of the shaft with contact pressure which does not prevent free rotation of the shaft. When the contact pressure is raised excessively, frictional resistance increases, so that the frictional resistance as a whole of the bearing also increases. The load pressing the solid particle trap portion to the shaft is desirable to be such a contact pressure that the frictional resistance between the solid particle trap portion and the shaft during rotation does not go beyond 50% of the entirety of the frictional resistance between the shaft and the bearing. Further, when the above-mentioned solid particle trap portion is arranged at a position close to the above-mentioned shaft, it is desirable that a gap between the solid particle trap portion and the shaft is in a range of 0.01 to 0.1 mm. Since the diameter of the solid particles is about 0.1 mm, the solid particles are easy to be entrained when the gap is 0.1 mm or more.

Further, in a continuous hot-dip plating apparatus in which the molten metal immersion bearings according to the present invention are used for sink rolls, support rolls or drawing rolls, the continuous working time of the apparatus is improved from 10 days in conventional apparatus to at least one-month.

DETAILED DESCRIPTION OF THE PREFERRED EMBODIMENTS

Figure 1:
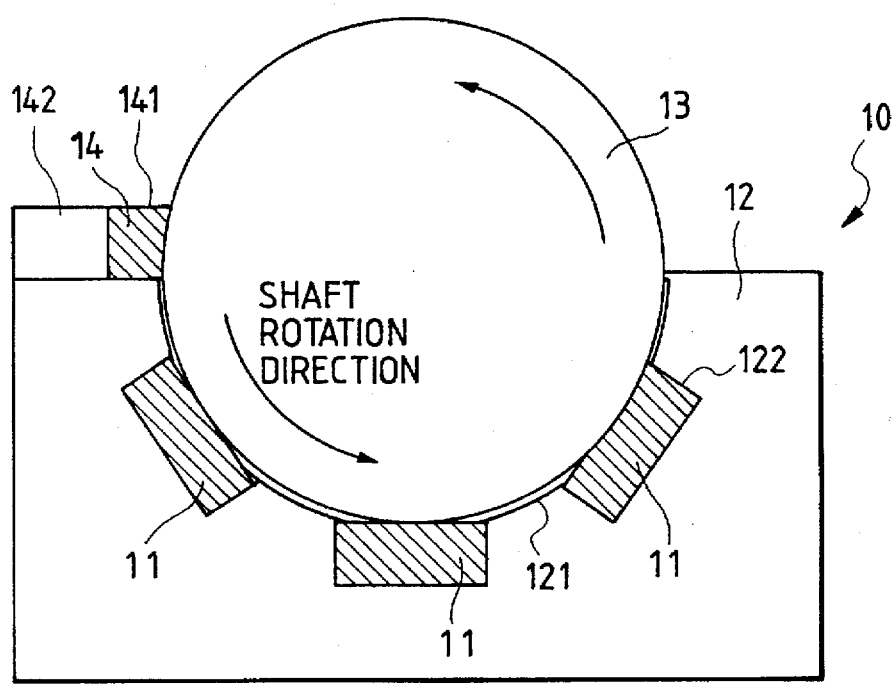
FIG. 1 is a sectional view of a bearing of an embodiment of the present invention and a shaft supported by the bearing.

Embodiments of the invention will be described hereunder referring to the drawings.

Embodiment 1

In FIG. 1, a molten metal immersion sliding bearing 10 (type 1) comprises a bearing support 12, slide pads 11 and a solid particle trap portion 14. The bearing support 12 has a shaft-receiving surface 121 having a hemi-circular shape and extending axially, and a plurality of grooves 122 each formed on the surface 121 equidistantly from each other. The grooves 122 each have a rectangular shape and are axially extending. In the grooves 122, slide pads 11 are inserted to form a sliding surface for a shaft 13. The solid particle trap portion 14 is provided on the bearing support 12 on the side wherein the sliding surface of the shaft 13 starts to contact the sliding surface of the bearing.

The solid particle trap portion 14 comprises cloth 141 made of alumina fiber and filled in a recess of 10 mm depth formed in a supporter member 142. The supporter or supporter member 142 can be a part of bearing support 12 or a separate member fixed to the bearing member 12. The amount of the cloth filled in the recess is such that the alumina fiber cloth is pressed at contact a pressure of about 0.1 kg/cm$^2$ by the shaft 13. In this embodiment, under this contact pressure, frictional resistance between the solid particle trap portion 14 and the shaft 13 during rotation of the shaft does not exceed 30% of the entire frictional resistance of the bearing. The length of the solid particle trap portion in the axial direction of the shaft is 130 mm, the width thereof in the peripheral direction is 40 mm, and the solid particle trap portion 14 contacts with the entire sliding surface of the shaft when the shaft 13 rotates one turn.

As the material used for the sliding surface of the bearing, that is, as material of the slide pads 11, carbon fiber reinforced carbon composite material (C/C composite material) is used. In the C/C composite material, carbon fiber is compounded in a uni-axal direction. The C/C composite material is set in the bearing so that the fiber direction is in the rotation direction of the shaft 13. The size of the pad of C/C composite material is 130×15×10 mm, a face of 150×15 mm is used for the sliding surface. The pads 11 are arranged equidistantly on the bearing receiving surface 121 on which load is applied.

After the pads 11 are inserted in the grooves 122, the shaft 13 is fitted and then a running-in operation is carried out so that the sliding surface of each of the pads 11 is made into a curved surface corresponding to the sliding surface of the shaft 13 and the gap between the shaft 13 and the bearing receiving surface 121 is 0.5 mm or less.

The bearing as shown in FIG. 1 has a shaft contact part which is hemi-cylindrical and the diameter of which is 150 mm and the length is 130 mm. The bearing bears downward force. The bearing support 12 is made of stainless steel of SUS 316.

The shaft 13 is formed of a sleeve and a shaft fitted in the sleeve. The sleeve is made of SIALON ceramics (ceramics comprising Si, Al, O and N) and having an outer diameter of 150 mm, and inner diameter of 110 mm and a length of 130 mm. The shaft is made of stainless steel of SUS 316 and has a diameter of 110 mm and a length of 130 mm.

Using the above-mentioned molten metal immersion bearing 10 and the shaft 13, a sliding experiment in a molten metal bath was conducted by a simulation apparatus for molten metal immersion bearings to measure wear loss (amount of wear) and coefficient of friction.

In the experiment, the bearing and the shaft were submerged in a molten zinc bath of 470° C., and the shaft slides under the conditions of a periphery velocity of 25 m/min and a contact pressure in the radial direction of 9 kg/cm$^2$. Measurement of wear loss and coefficient of friction was carried out until an amount of wear reaches 10 mm or the measuring time reaches 50 days. As for the wear loss, the relative change in position of the shaft to the bearing was measured by a dial gauge mounted on the test apparatus and the measured value is assumed to be an amount of wear. As for the coefficient of friction, the frictional resistance of the rotation was measured by a torque meter mounted on the test apparatus, and the coefficient of friction was calculated from the measured frictional resistance and contact pressure.

The molten zinc bath having a composition of 0.1% Fe, 0.1% Al, 0.01%Pb and a remainder of Zn was used to generate dross in the molten zinc. The molten zinc supplied for the experiment was sampled, cooled and solidified, and then the structure thereof was observed by a scanning electron microscope (SEM) and element analysis was effected by an electron probe micro analyzer (EPMA). As a result, intermetallic compound particles of Fe—Zn, Fe—Al whose particle size is about 100 μm, and fine particles of zinc oxide, aluminum oxide were observed.

Figure 10:
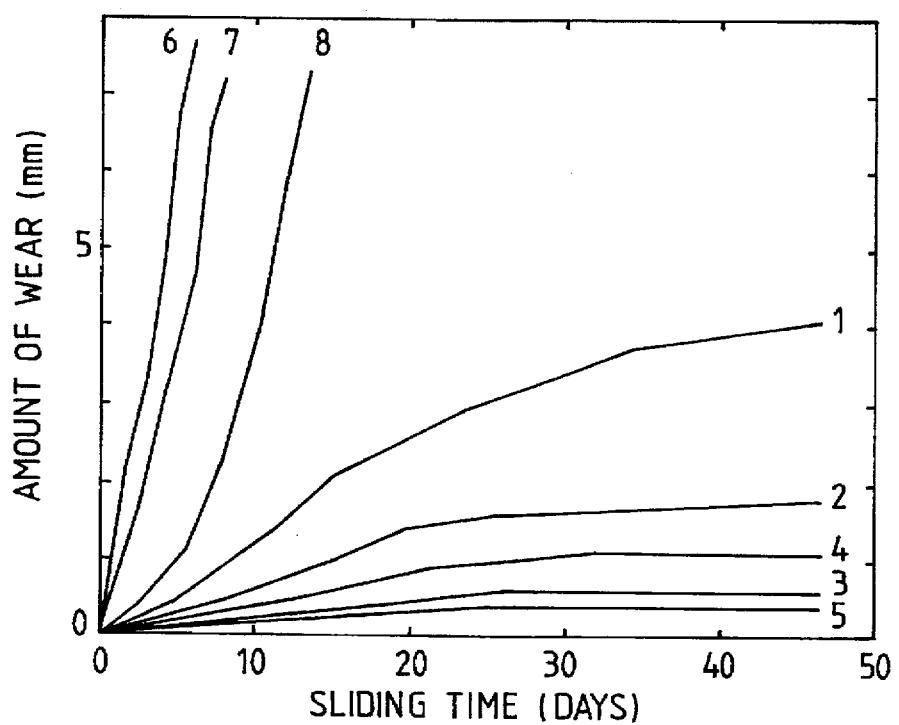
FIG. 10 is a graph showing relations between the sliding time and an amount of wear.

The measured result of the amount of wear is shown in FIG. 10. In the bearing shown in FIG. 1, an amount of wear was 5 mm or less after the test for one month.

Figure 11:
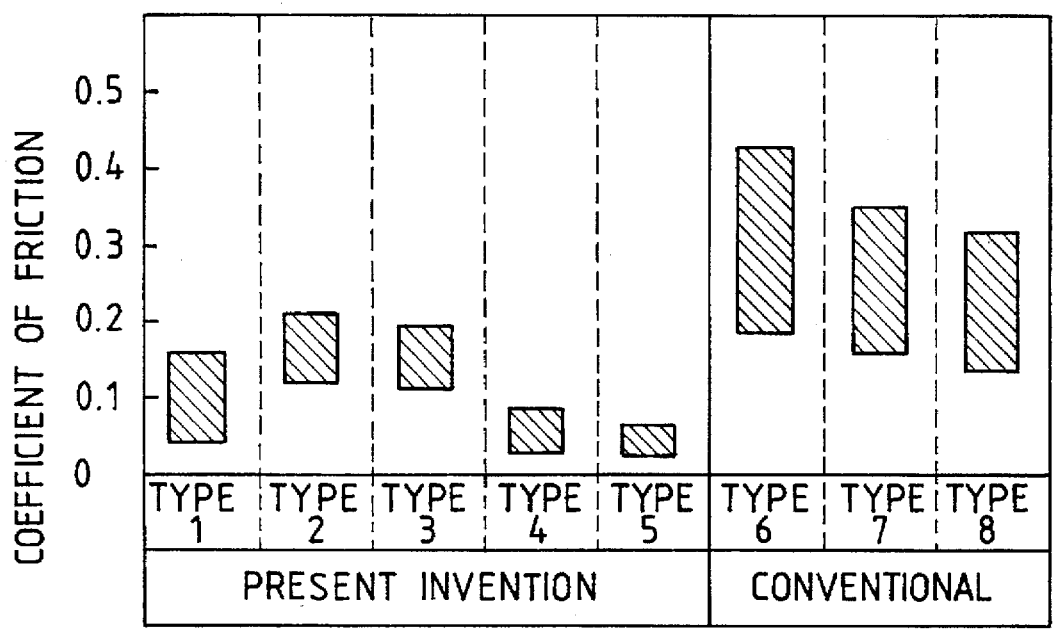
FIG. 11 is a graph showing the coefficient of friction in each of the bearings of the present invention and conventional bearings.

The measured result of coefficient of friction is shown in FIG. 11. In the bearing according to the present invention, an increase or variation of coefficient of friction due to penetration of solid particles is small and the coefficient of friction is always 0.15 or less.

Further, in the above-mentioned experiment, when the alumina fiber cloth of the solid particle trap portion 14 is replaced with carbon fiber or carbon felt, the same result was obtained.

Still further, in this embodiment, as a method of pressing the solid particle trap portion on the shaft, fiber cloth is filled in the recess, however, a method of arranging a spring on the bottom of the recess and pressing the fiber cloth on the shaft by elastic force of the spring, or a method of filling a substance having a large thermal expansion in the bottom of the recess and pressing the fiber cloth on the shaft at a suitable contact pressure can be used, whereby the same result can be attained.

Yet further, in the above-mentioned experiment, as the solid lubricant used for the sliding surfaces, carbon material or h-BN can be used instead of the C/C composite material, whereby the same result can be brought.

Still further, in the above-mentioned experiment, by using, as a molten metal, molten 45% Zn—55%Al of 600° C. or molten Al of 650° C. each containing solid particles such as dross, the same effect also was attained. An effect of the present invention is caused by the solid particles not penetrating between the sliding surfaces of the shaft and the bearing, but does not depend on the kind of molten metal.

Further, as for the periphery velocity at the time of sliding and the conditions of contact pressure in the radial direction, a sliding test similar to the above was executed by changing the periphery velocity and the contact pressure in a range of 5 to 50 m/min and 1 to 20 kg/cm$^2$, respectively, in this case also, the same effect as above was attained concerning the wear resistance property and friction characteristics of the bearing according to the present invention.

Still further, the material used for the bearing support is not limited to stainless steel SUS 316 which is used in the above-mentioned embodiment, but any material can be used if it is provided with anti-corroditivity against molten metal in which the bearing is submerged and sufficient strength and toughness necessary for forming a bearing support material.

Further, the structure of the shaft and material used therein are not limited to the material construction of the bearing as mentioned above, that is, the construction and the material in which the shaft of SUS 316 is fitted in the SIALON ceramics sleeve, but any material can be used if it is provided with anti-corroditivity against the molten metal in which the bearing is submerged and sufficient strength and toughness necessary for forming the shaft.

Embodiment 2

Figure 2:
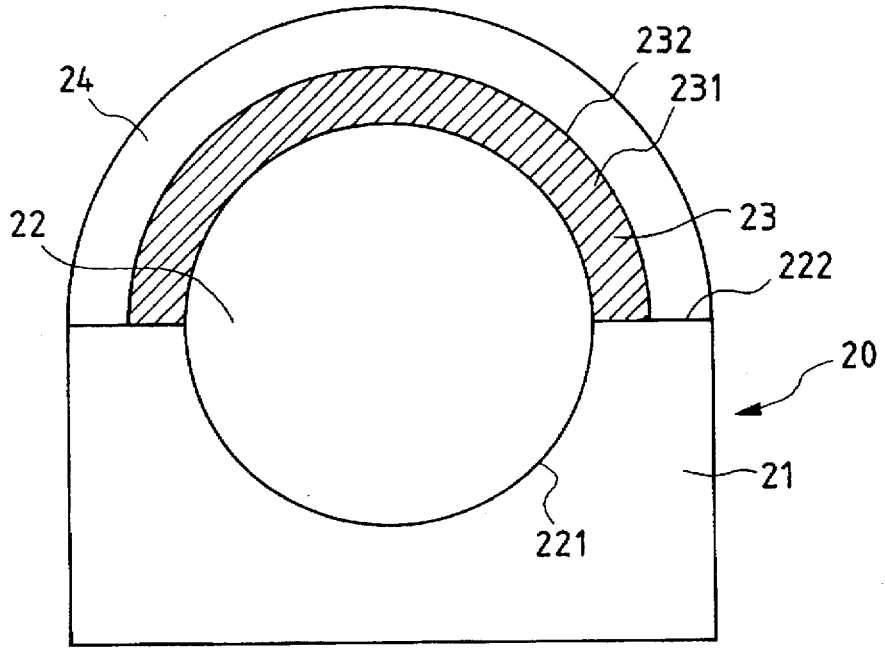
FIG. 2 is a sectional view of a bearing of another embodiment of the present invention.

A molten metal immersion bearing (type 2) of this embodiment is shown in FIG. 2.

In FIG. 2, the molten metal immersion bearing 20 comprises a bearing support 21 having a hemi-cylindrical sliding surface 221 and a solid particle trap portion 23 held in a support member 24 secured to the bearing support 21 at abutment 222. A shaft 22 is inserted in the space formed by the bearing support 21 and the solid particle trap portion 23. The solid particle trap portion 23 comprises cloth 231 made of alumina fiber and filled in a recess 232 of 10 mm depth formed in a supporter 24. The supporter 24 can be a part of bearing support 21 or a separate member fixed to the bearing support 21. An amount of the cloth 231 filled in the recess 232 is such that the alumina fiber cloth 231 is pressed at a contact pressure of about 0.1 kg/cm$^2$ by the shaft 22. In this embodiment, under this contact pressure, frictional resistance between the solid particle trap portion 23 and the shaft 22 during rotation of the shaft does not go beyond 30% of the entire frictional resistance of the bearing. The length of the solid particle trap portion in the axial direction of the shaft is 130 mm and the solid particle trap portion 23 contacts with the entire sliding surface of the shaft when the shaft 22 rotates one half-turn. The solid particle trap portion 23 covers ½ of the periphery of the shaft, as shown in FIG. 2.

The shaft 22 is formed of a SIALON ceramics sleeve and a shaft of stainless steel SUS 316 fitted in the sleeve, as in the embodiment 1.

Using the above-mentioned molten metal immersion bearing and the shaft 22, a sliding experiment in a molten metal was conducted in the same manner and under the same conditions as in the embodiment 1 to measure change of an amount of wear as time lapses and coefficient of friction.

The measured result of the amount of wear is shown in FIG. 10. In the bearing shown in FIG. 2, an amount of wear is 2 mm or less after the test for more than one month.

The measured result of coefficient of friction is shown in FIG. 11. In the bearing according to the present invention, an increase or variation of coefficient of friction due to penetration of solid particles is small and the coefficient of friction is always 0.2 or less.

Further, in the above-mentioned experiment, when the alumina fiber cloth of the solid particle trap portion 23 was replaced with carbon fiber or carbon felt, the same result also was obtained.

Further, in this embodiment, as a method of pressing the solid particle trap portion on the shaft, fiber cloth is filled in the recess, however, a method of arranging a spring on the bottom of the recess and pressing the fiber cloth on the shaft by elastic force of the spring, or a method of filling a substance having a large thermal expansion in the bottom of the recess and pressing the fiber cloth on the shaft at a suitable contact pressure can be used, whereby the same result can be attained.

Further, in the above-mentioned experiment, by using, as a molten metal, molten 45% Zn—55%Al of 600° C. or molten Al of 650° C. each containing solid particles such as dross, the same effect also was attained. An effect of the present invention is caused by the solid particles not penetrating between the sliding surfaces of the shaft and the bearing, but does not depend on the kind of molten metal.

Further, as for the periphery velocity at the time of sliding and the conditions of contact pressure in the radial direction of shaft, a sliding test similar to the above was executed by changing the periphery velocity and the contact pressure in a range of 5 to 50 m/min and 1 to 20 kg/cm$^2$, respectively, in this case also, the same effect as above was attained concerning the wear resistance property and friction characteristics of the bearing according to the present invention.

Still further, the material used for the bearing support is not limited to stainless steel SUS 316 which is used in the above-mentioned embodiment, but any material can be used if it is provided with anti-corroditivity against molten metal in which the bearing is submerged and sufficient strength and toughness necessary for forming a bearing support material.

Further, the structure of the shaft and material used therein are not limited to the material construction of the bearing as mentioned above, that is, the construction and the material in which the shaft of SUS 316 is fitted in the SIALON ceramics sleeve, but any material can be used if it is provided with anti-corroditivity against the molten metal in which the bearing is submerged, and sufficient strength and toughness necessary for forming the shaft.

Embodiment 3

Figure 3:
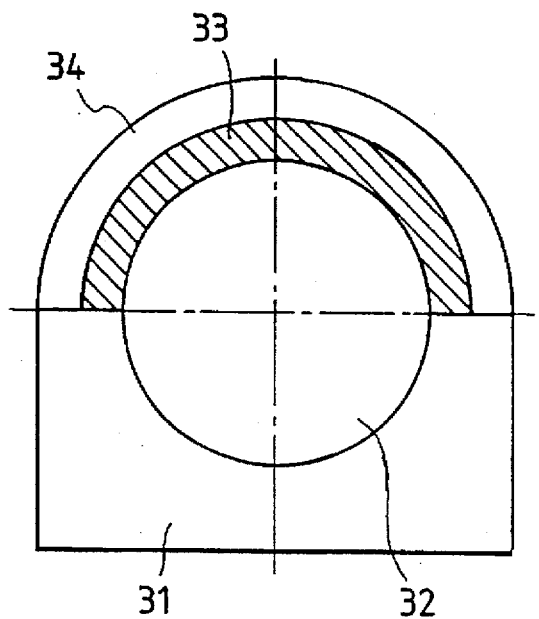
FIG. 3 is a sectional view of a bearing of another embodiment of the present invention.
Figure 3A:
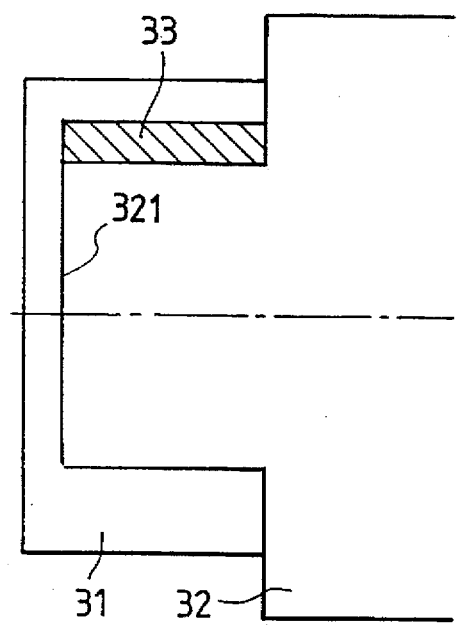

Referring to FIG. 3, molten metal immersion bearing (type 3) of this embodiment comprises a bearing support 31, a solid particle trap portion 33 and a supporter 34. The bearing type 3 is the same construction and size as the bearing type 2 except that the bearing in this embodiment covers the end face 321 of a shaft 32. The shaft 32 is formed of a SIALON ceramics sleeve and a shaft of stainless steel SUS 316 fitted in the sleeve, as in the embodiment 1.

Using the above-mentioned molten metal immersion bearing and the shaft 32, a sliding experiment in a molten metal bath was conducted using the simulation apparatus for molten metal immersion bearings in the same manner and under the same conditions as in the embodiment 1 to measure change of an amount of wear as time lapses and coefficient of friction.

The measured result of the amount of wear is shown in FIG. 10. In the bearing type 3 shown in FIG. 3, an amount of wear is 1 mm or less after the test for more than one month.

The measured result of coefficient of friction is shown in FIG. 11. In the bearing according to the present invention, an increase or variation of coefficient of friction due to penetration of solid particles is small and the coefficient of friction is always 0.2 or less.

Further, in the above-mentioned experiment, when the alumina fiber cloth of the solid particle trap portion 33 is replaced with carbon fiber or carbon felt, the same result also was obtained.

Still further, in this embodiment, as a method of pressing the solid particle trap portion on the shaft, fiber cloth is filled in the recess, however, a method of arranging a spring on the bottom of the recess and pressing the fiber cloth on the shaft by elastic force of the spring, or a method of filling a substance having a large thermal expansion in the bottom of the recess and pressing the fiber cloth on the shaft at a suitable contact pressure can be used, whereby the same result can be attained.

Yet further, in the above-mentioned experiment, by using, as a molten metal, molten 45% Zn—55%Al of 600° C. or molten Al of 650° C. each containing solid particles such as dross, the same effect also was attained. An effect of the present invention is caused by the solid particles not penetrating between the sliding surfaces of the shaft and the bearing, but does not depend on the kind of molten metal.

Still further, as for the periphery velocity at the time of sliding and the conditions of contact pressure in the radial direction of shaft, a sliding test similar to the above was executed by changing the periphery velocity and the contact pressure in a range of 5 to 50 m/min and 1 to 20 kg/cm$^2$, respectively, in this case also, the same effect as above was attained concerning the wear resistance property and friction characteristics of the bearing according to the present invention.

Still further, the material used for the bearing support is not limited to stainless steel SUS 316 which is used in the above-mentioned embodiment, but any material can be used if it is provided with anti-corroditivity against molten metal in which the bearing is submerged, and sufficient strength and toughness necessary for forming a bearing support material.

Further, the structure of the shaft and material used therein are not limited to the material construction of the bearing as mentioned above, that is, the construction and the material in which the shaft of SUS 316 is fitted in the SIALON ceramics sleeve, but any material can be used if it is provided with anti-corroditivity against the molten metal in which the bearing is submerged, and sufficient strength and toughness necessary for forming the shaft.

Embodiment 4

Figure 4:
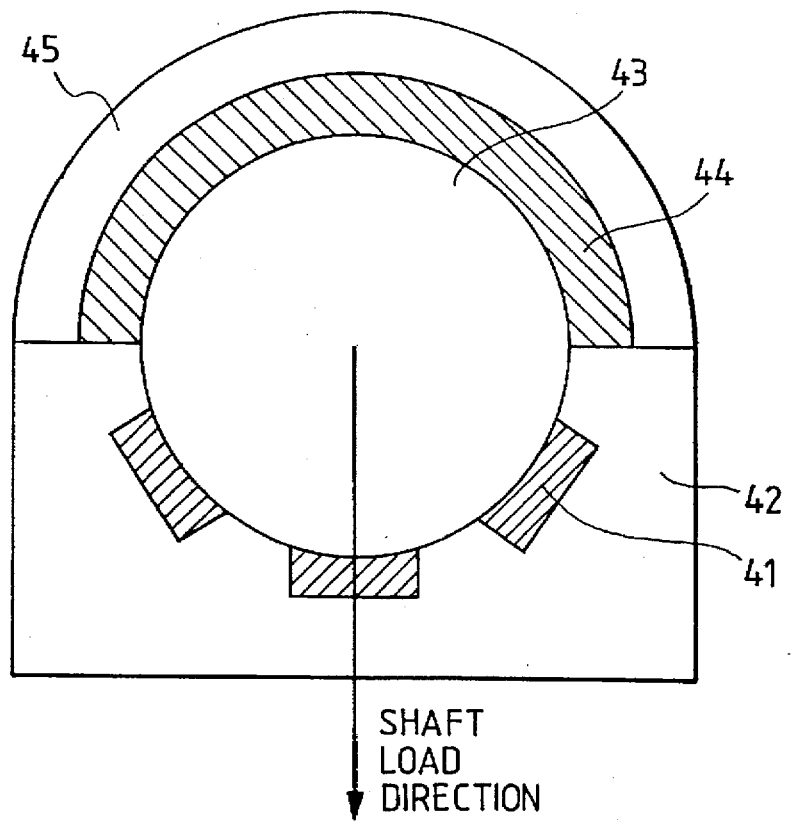
FIG. 4 is a sectional view of a bearing of another embodiment of the present invention.

Referring to FIG. 4, molten metal immersion bearing (type 4) of this embodiment comprises a bearing support 42, slide pads 41, a solid particle trap portion 44 and a supporter 45. The bearing type 4 is the same construction and size as the bearing type 2 except that the bearing in this embodiment employs the pads 41 each made of C/C composite material.

A shaft 43 is formed of a SIALON ceramics sleeve and a shaft of stainless steel SUS 316 fitted in the sleeve, as in the embodiment of FIG. 1.

The construction of the bearing sliding portion using C/C composite material is the same as the embodiment 1.

Using the above-mentioned molten metal immersion bearing and the shaft 43, a sliding experiment in a molten metal bath was conducted using the simulation apparatus for molten metal immersion bearings in the same manner and under the same conditions as in the first embodiment to measure a change of an amount of wear as time lapses and coefficient of friction.

The measured result of the amount of wear is shown in FIG. 10. In the bearing type 4 shown in FIG. 4, an amount of wear is 2 mm or less after the test for more than one month.

The measured result of coefficient of friction is shown in FIG. 11. In the bearing according to the present invention, an increase or variation of coefficient of friction due to penetration of solid particles is small and the coefficient of friction is always 0.1 or less.

Further, in the above-mentioned experiment, when the alumina fiber cloth of the solid particle trap portion 44 was replaced with carbon fiber or carbon felt, the same result was obtained.

Still further, in this embodiment, as a method of pressing the solid particle trap portion on the shaft, fiber cloth is filled in the recess, however, a method of arranging a spring on the bottom of the recess and pressing the fiber cloth on the shaft by elastic force of the spring, or a method of filling a substance having a large thermal expansion in the bottom of the recess and pressing the fiber cloth on the shaft at a suitable contact pressure can be used, whereby the same result can be attained.

Yet further, in the above experiment, as the solid lubricant used for the sliding surface, carbon material or h-BN can be used instead of the C/C composite material, whereby the same result is attained.

Still further, in the above-mentioned experiment, by using, as a molten metal, molten 45% Zn—55%Al of 600° C. or molten Al of 650° C. each containing solid particles such as dross, the same effect also was attained. An effect of the present invention is caused by the solid particles not penetrating between the sliding surfaces of the shaft and the bearing, but does not depend on the kind of molten metal.

Further, as for the periphery velocity at the time of sliding and the conditions of contact pressure in the radial direction of shaft, a sliding test similar to the above was executed by changing the periphery velocity and the contact pressure in a range of 5 to 50 m/min and 1 to 20 kg/cm$^2$, respectively, in this case also, the same effect as above was attained concerning the wear resistance property and friction characteristics of the bearing according to the present invention.

Still further, the material used for the bearing support is not limited to stainless steel SUS 316 which is used in the above-mentioned embodiment, but any material can be used if it is provided with anti-corroditivity against molten metal in which the bearing is submerged and sufficient strength and toughness necessary for forming a bearing support material.

Further, the structure of the shaft and material used therein are not limited to the material construction of the bearing as mentioned above, that is, the construction and the material in which the shaft of SUS 316 is fitted in the SIALON ceramics sleeve, but any material can be used if it is provided with anti-corroditivity against the molten metal in which the bearing is submerged and sufficient strength and toughness necessary for forming the shaft.

Embodiment 5

Figure 5:
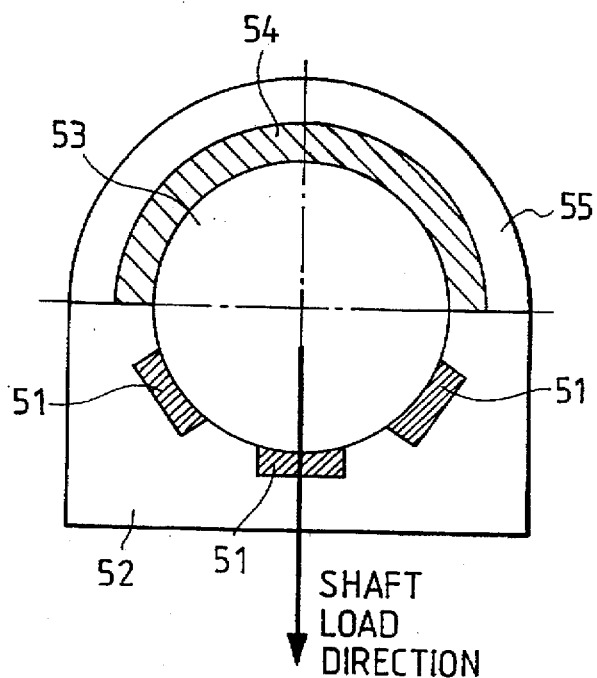
FIG. 5 is a sectional view of a bearing of another embodiment of the present invention.
Figure 5A:
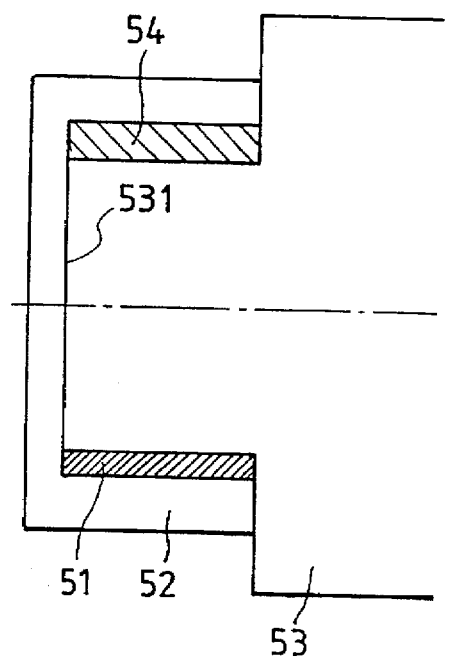

A molten metal immersion bearing (type 5) of this embodiment shown in FIG. 5 comprises a bearing support 52, slide pads 51, a solid particle trap portion 54 and a supporter 55. The bearing type 5 is the same construction and size as the bearing type 3 except that the bearing in this embodiment covers an end face 531 of a shaft 53.

A shaft 53 is formed of a SIALON ceramics sleeve and a shaft of stainless steel SUS 316 fitted in the sleeve, as in the embodiment 1.

Using the above-mentioned molten metal immersion bearing and the shaft 53, a sliding experiment in a molten metal bath was conducted using the simulation apparatus for molten metal immersion bearings in the same manner and under the same conditions as in the first embodiment to measure a change of an amount of wear as time lapses and coefficient of friction.

The measured result of the amount of wear is shown in FIG. 10. In the bearing type 5, an amount of wear is 1 mm or less after the test for more than one month.

The measured result of coefficient of friction is shown in FIG. 11. In the bearing according to the present invention, an an increase or variation of coefficient of friction due to penetration of solid particles is small and the coefficient of friction is always 0.1 or less.

Further, in the above-mentioned experiment, when the alumina fiber cloth of the solid particle trap portion 44 was replaced with carbon fiber or carbon felt, the same result was obtained.

Still further, in this embodiment, as a method of pressing the solid particle trap portion on the shaft, fiber cloth is filled in the recess, however, a method of arranging a spring on the bottom of the recess and pressing the fiber cloth on the shaft by elastic force of the spring, or a method of filling a substance having a large thermal expansion in the bottom of the recess and pressing the fiber cloth on the shaft at a suitable contact pressure can be used, whereby the same result can be attained.

Yet further, in the above experiment, as the solid lubricant used for the sliding surface, carbon material or h-BN can be used instead of the C/C composite material, whereby the same result is attained.

Still further, in the above-mentioned experiment, by using, as a molten metal, molten 45% Zn—55%Al of 600° C. or molten Al of 650° C. each containing solid particles such as dross, the same effect also was attained. An effect of the present invention is caused by the solid particles not penetrating between the sliding surfaces of the shaft and the bearing, but does not depend on the kind of molten metal.

Further, as for the periphery velocity at the time of sliding and the conditions of contact pressure in the radial direction of shaft, a sliding test similar to the above was executed by changing the periphery velocity and the contact pressure in a range of 5 to 50 m/min and 1 to 20 kg/cm$^2$, respectively, in this case also, the same effect as above was attained concerning the wear resistance property and friction characteristics of the bearing according to the present invention.

Still further, the material used for the bearing support is not limited to stainless steel SUS 316 which is used in the above-mentioned embodiment, but any material can be used if it is provided with anti-corroditivity against molten metal in which the bearing is submerged and sufficient strength and toughness necessary for forming a bearing support material.

Further, the structure of the shaft and material used therein are not limited to the construction and material of the shaft as mentioned above, that is, the construction and the material in which the shaft of SUS 316 is fitted in the SIALON ceramics sleeve, but any material can be used if it is provided with anti-corroditivity against the molten metal in which the bearing is submerged and sufficient strength and toughness necessary for forming the shaft.

Tests were executed on the gap between the solid particle trap portion and the sliding surface of the shaft and an effect of prevention of penetration and removal of solid particles.

In the molten metal immersion bearing type 1, the gap between the solid particle trap portion and the sliding surface of the shaft was changed to take various values, and in each case, a wear rate in the molten zinc was measured in the same manner as in the first embodiment. Relations between the gap between the solid particle trap portion and the sliding surface of the shaft and the wear rate are shown in FIG. 12, in which characteristic curves each show relations of an amount of wear and sliding time, taking the gap size (mm) as a parameter.

Figure 12:
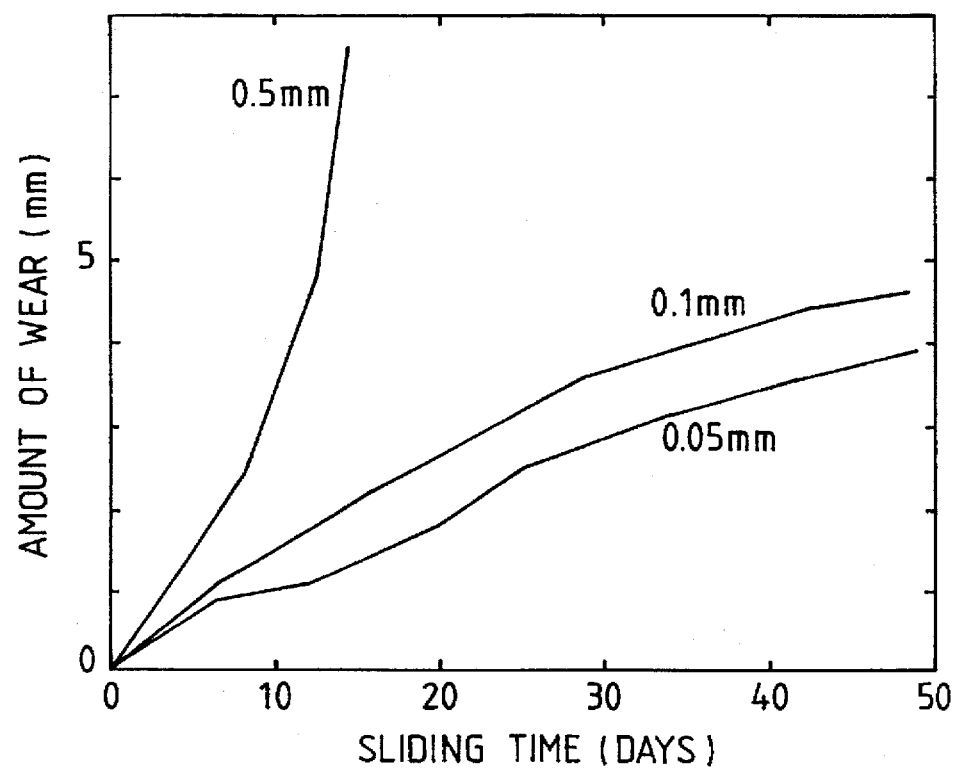
FIG. 12 is a graph showing the relationship between the amount of wear and sliding time with the parameter of the gap size between the solid particle trap portion and the sliding surface of shaft.

From FIG. 12, it is noted that when the gap between the solid particle trap portion and the sliding surface of the shaft becomes 0.5 mm or more, an effect of solid particle penetration prevention at the solid particle trap portion can not be expected. This is why particle diameter of solid particles existing in the molten metal is about 100 μm. From the test result, it is noted that the above-mentioned effect can be attained not only by pressing the solid particle trap portion on the sliding surface of the shaft at a suitable contact pressure as described in the first embodiment, but by arranging the solid particle trap portion at a position close to the sliding surface of shaft.

Further, a similar effect can be attained by each of the bearings types 2 to 5 as well as the bearing type 1.

Figure 9:
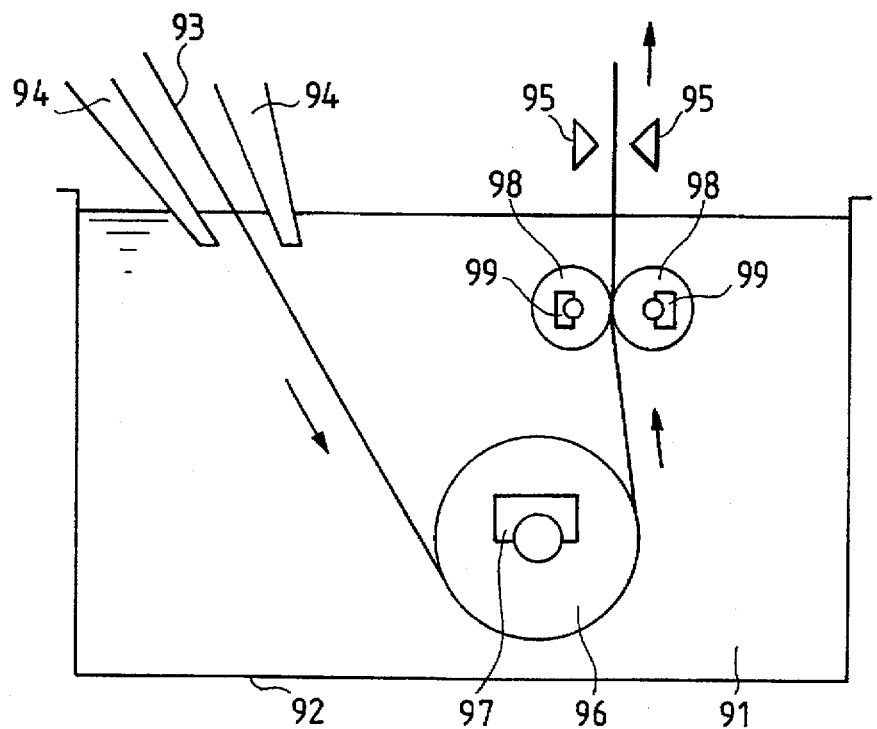
FIG. 9 is a schematic diagram of a continuous hot-dip plating apparatus.

An embodiment of a continuous hot-dip plating apparatus according to the present invention is described referring to FIG. 9.

In FIG. 9, the continuous hot-dip plating apparatus comprises a plating bath 92 filled with molten metal 91 for plating, a sink roll 96 supported by sink roll bearings 97 and submerged in the molten metal, a pair of support rolls 98 each supported by support roll bearings 99, a pair of gas wiping nozzles 95 and a snout 94. A strip 93 to be plated runs into the molten metal bath and goes out of the molten metal bath through the sink rolls 96, support rolls 98. The strip 93 from the molten bath 92 is wiped by jet gas from the gas wiping nozzles 95, whereby excess metal is removed.

In this apparatus, molten metal immersion bearings each having a construction shown in FIG. 1 to 5 are used for the sink roll bearings 97, and rolls each comprising a SIALON ceramics sleeve and a shaft of stainless steel SUS 316 fitted in the sleeve are used for the sink roll 96. A test of the bearing was conducted under this practical apparatus. For comparison, conventional bearings shown in FIGS. 6 to 8 also were tested.

The sink roll bearing 97 and the sink roll 96 used in the apparatus have the same construction and size as those of the bearing and the shaft in FIGS. 1 to 5. A sliding test was conducted under the conditions that the molten metal is zinc of 470° C., the periphery velocity of the sink roll is 25 m/min and contact pressure in radial direction is 9 kg/cm². The composition of the used molten zinc is 0.1%Fe, 0.1%Al, 0.01%Pb and the balance of Zn.

In each construction of the molten metal immersion bearings shown in FIGS. 1 to 5, the roll operates smoothly.

The bearing and the roll at the bearing almost did not wear, and no problem occured in a continuous operation for 100 days.

COMPARISON EXAMPLE 1

Figure 6:
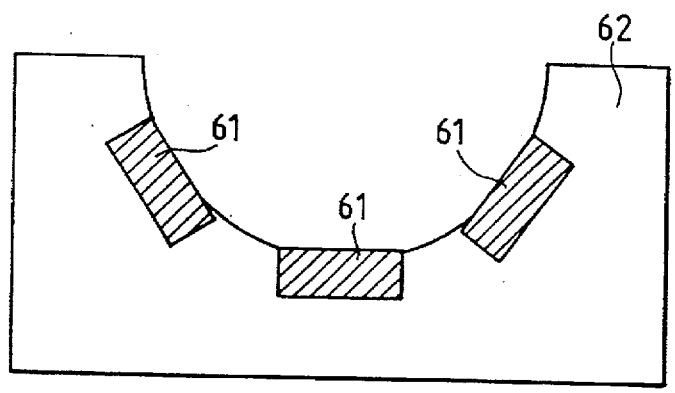
FIG. 6 is a sectional view of a conventional bearing for a sink roll.

As a comparison example, a molten metal immersion bearing type 6 shown in FIG. 6 was used. The bearing comprises a bearing support 62 and pads 61. This bearing is the same construction and size as the bearing type 1 except that the bearing type 6 does not have a solid particle trap portion.

A shaft to be supported by the bearing is the same as the shaft in the first embodiment, that is, it comprises a SIALON ceramics sleeve and a shaft of stainless steel SUS 316 fitted in the sleeve.

A sliding test of the bearing and the shaft in molten zinc was conducted using the simulation apparatus for molten metal to measure a change in wear as time lapses and coefficient of friction. The test was carried out under the same manner and conditions as in the first embodiment.

The measured result of an amount of wear is shown in FIG. 10. In the bearing type 6, an amount of wear is 5 mm or more in three days or so.

Further, the measured result of coefficient of friction is shown in FIG. 11. In the bearing type 6, coefficient of friction changes widely from 0.2 to 0.4 by biting of solid particles such as dross irrespective of use of solid lubricant for the sliding surfaces.

Further, in the above experiment, as the solid lubricant applied on the sliding surface, carbon material or h-BN can be used instead of C/C composite material, whereby the same effect is brought.

Further, in the above-mentioned experiment, by using, as a molten metal, molten 45% Zn—55%Al of 600° C. or molten Al of 650° C. each containing solid particles such as dross, the same effect also was attained.

Further, as for the periphery velocity at the time of sliding and the conditions of contact pressure in the radial direction of the shaft, a sliding test similar to the above was executed by changing the periphery velocity and the contact pressure in a range of 5 to 50 m/min and 1 to 20 kg/cm², respectively, in this case also, the same effect as above was attained.

COMPARISON EXAMPLE 2

Figure 7:
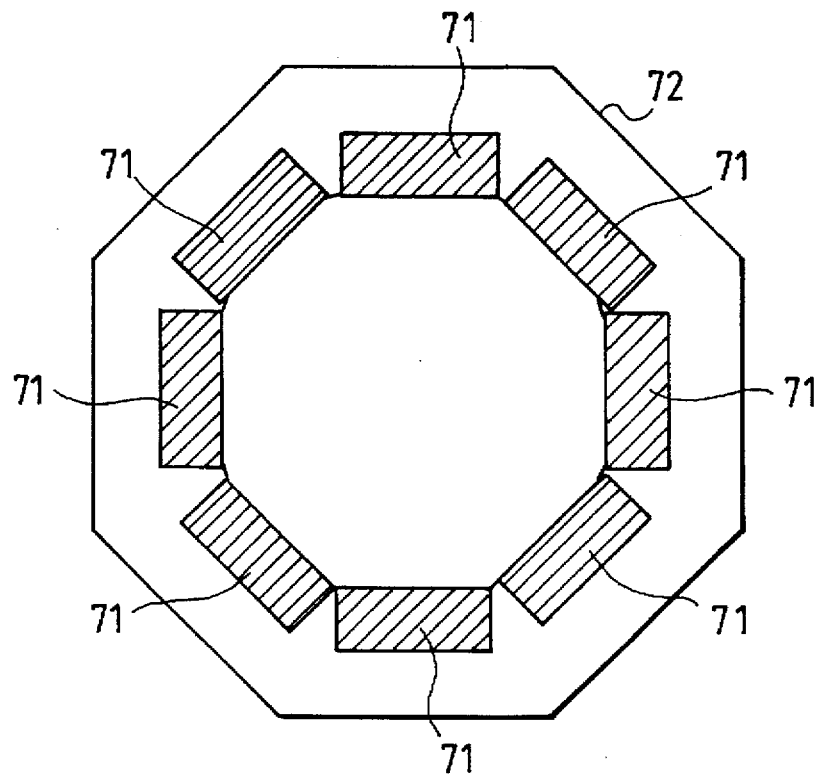
FIG. 7 is a sectional view of a conventional bearing for support roll.

As another comparison example, a molten metal immersion bearing type 7 shown in FIG. 7 was used. The bearing comprises a bearing support 72 and pads 71. The bearing support 72 is made of stainless steel SUS 316, and the pads 71 each are of C/C composite material. Fiber dimension and orientation of the material of the pad are the same as in FIG. 1.

A shaft to be supported by the bearing is the same as the shaft in the first embodiment, that is, it comprises a SIALON ceramics sleeve and a shaft of stainless steel SUS 316 fitted in the sleeve.

A sliding test of the bearing and the shaft in molten zinc was conducted using a simulation apparatus for molten metal to measure change in wear as time lapses and coefficient of friction. The test was carried out under the same manner and conditions as in the first embodiment.

The measured result of amount of wear is shown in FIG. 10. In the bearing type 7, an amount of wear is 5 mm or more in 5 days or so.

Further, the measured result of coefficient of friction is shown in FIG. 11. In the bearing type 7, coefficient of friction changes largely from 0.2 to 0.35 by biting of solid particles such as dross irrespective of use of solid lubricant for the sliding surfaces.

Further, in the above experiment, as the solid lubricant applied on the sliding surface, carbon material or h-BN can be used instead of C/C composite material, whereby the same effect is brought.

Further, in the above-mentioned experiment, by using, as a molten metal, molten 45% Zn—55%Al of 600° C. or molten Al of 650° C. each containing solid particles such as dross, the same effect also was attained.

Further, as for the periphery velocity at the time of sliding and the conditions of contact pressure in the radial direction of the shaft, a sliding test similar to the above was executed by changing the periphery velocity and the contact pressure in a range of 5 to 50 m/min and 1 to 20 kg/cm$^2$, respectively, in this case also, the same effect as above was attained.

Further, the above results do not depend on kind of material used for the bearing support.

COMPARISON EXAMPLE 3

Figure 8:
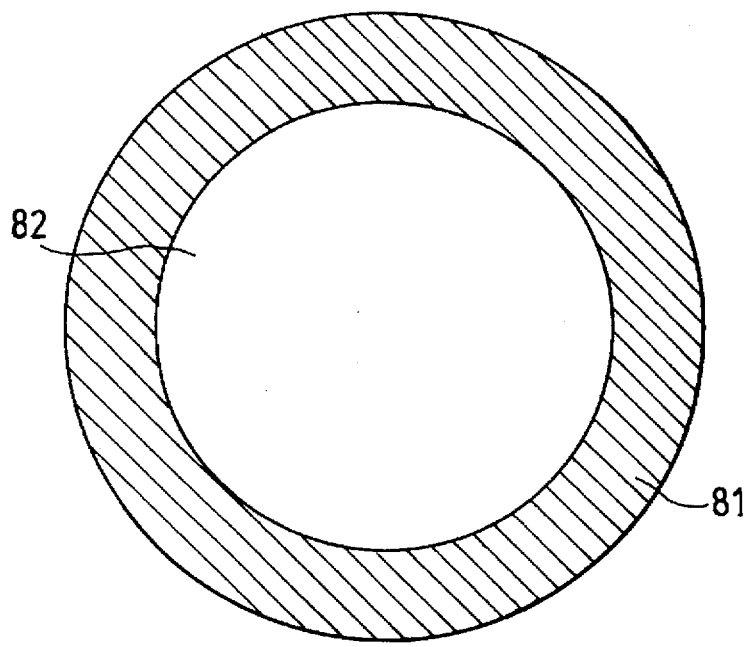
FIG. 8 is a sectional view of a conventional bearing.

As another comparison example, a molten metal immersion bearing type 8 shown in FIG. 8 was used. The bearing is made so that C/C composite material 81 covers all the periphery of a shaft 82.

A shaft to be supported by the bearing is the same as the shaft in the first embodiment, that is, it comprises a SIALON ceramics sleeve and a shaft of stainless steel SUS 316 fitted in the sleeve.

A sliding test of the bearing and the shaft in molten zinc was conducted using a simulation apparatus for molten metal to measure change in wear as time lapses and coefficient of friction. The test was carried out under the same manner and conditions as in the first embodiment.

The measured result of amount of wear is shown in FIG. 10. In the bearing type 8, an amount of wear is less than the bearings type 6 and 7 in first few days. However, once the wear begins, the wear increases at the same speed as one of the bearing types 6 and 7, an amount of the wear reaches to 5 nor more in 8 days or so.

Further, the measured result of coefficient of friction is shown in FIG. 11. In the bearing type 8, coefficient of friction changes largely from 0.2 to 0.35 by biting of solid particles such as dross irrespective of use of solid lubricant for the sliding surfaces.

Further as the material for the sliding surface, carbon material or h-BN can be used instead of C/C composite material, whereby the same effect is brought.

Further, in the above-mentioned experiment, by using, as a molten metal, molten 45% Zn—55%Al of 600° C. or molten Al of 650° C. each containing solid particles such as dross, the same effect also was attained.

Further, as for the periphery velocity at the time of sliding and the conditions of contact pressure in the radial direction of the shaft, a sliding test similar to the above was executed by changing the periphery velocity and the contact pressure in a range of 5 to 50 m/min and 1 to 20 kg/cm$^2$, respectively, in this case also, the same effect as above was attained.

Further, the above results do not depend on kind of material used for the bearing support.

The molten metal immersion bearing according to the present invention can prevent abrasive wear and an increase in abrasive wear due to biting of solid particles such as intermetallic compounds between the sliding surfaces of the shaft and the bearing.

What is claimed is:

1. A sliding bearing to be immersed in a molten metal, comprising:

a shaft support portion for rotatably supporting a shaft, said shaft support portion circumferentially partially surrounding said shaft so that a part of said shaft is exposed to the molten metal;

a solid particle trap portion for preventing solid particles in the molten metal from penetrating between said shaft support portion and the sliding surface of said shaft, said solid particle trap portion being arranged circumferentially closely to a portion of said shaft support portion at which the sliding surface of said shaft starts to enter said shaft support portion, and being provided with a portion allowing said shaft to be exposed to the molten metal.

2. A molten metal immersion sliding bearing in use in a molten metal, comprising:

a shaft support portion for rotatably supporting a shaft, said shaft support portion surrounding a part of said shaft so that a further part of said shaft is exposed to the molten metal;

a solid particle trap portion for preventing solid particles in the molten metal from penetrating between said shaft support portion and the sliding surface of said shaft, said solid particle trap portion being arranged so as to contact with the sliding surface of said shaft close to a circumferential end of said shaft support portion at which the sliding surface of said shaft starts to enter said shaft support portion, the other circumferential end of said shaft support portion opposite to said circumferential end of said shaft support portion being free of said solid particle trap portion.

3. A molten metal immersion sliding bearing according to claim 2, wherein said solid particle trap portion removes solid particles which penetrate between said shaft support portion and the sliding surface of said shaft.

4. A molten metal immersion sliding bearing according to claim 2, wherein said solid particle trap portion comprises a material having a fiber structure and a support member for fixing said material to said shaft support portion, said material being in contact with said sliding surface of said shaft.

5. The bearing according to claim 4, wherein said material having fiber structure is at least one of alumina fiber, carbon fiber and carbon felt.

6. The bearing according to claim 4, wherein a gap between said shaft and said solid particle trap portion is 0.01 to 0.1 mm.

7. The bearing according to claim 4, wherein said solid particle trap portion is pressed on said shaft at such a contact pressure that frictional resistance at rotation of said shaft does not exceed 50% of the entire frictional resistance between said shaft and said bearing.

8. The bearing according to claim 4, wherein a main element of said molten metal is Zn or Al.

9. A molten metal immersion sliding bearing according to claim 2, wherein said shaft support portion has a hemicylindrical shape, said shaft support portion being provided with a plurality of slide pads in its inside to form the supporting surface for said shaft.

10. A continuous hot-dip plating apparatus, comprising a sliding bearing immersed in molten metal, said bearing having a sliding portion rotatably supporting a shaft and a solid particle trap portion for preventing solid particles in the molten metal from penetrating between said shaft and said sliding portion and for removing solid particles penetrated between said shaft and said sliding portion, said solid particle trap portion being in contact with or in adjacent relation with a sliding surface of said shaft, and a portion of said solid particle trap portion in contact with or in adjacent relation with said sliding surface of said shaft being of material having a fiber structure.

11. The apparatus according to claim 10, wherein a gap between said shaft and said solid particle trap portion is 0.01 to 0.1 mm.

12. The apparatus according to claim 10, wherein said solid particle trap portion is pressed on said shaft at such a contact pressure that frictional resistance at rotation of said shaft does not exceed 50% of the entire frictional resistance between said shaft and said bearing.

13. The apparatus according to claim 10, wherein a main element of said molten metal is Zn or Al.

* * * * *